(12) United States Patent
Rasse et al.

(10) Patent No.: US 10,954,006 B2
(45) Date of Patent: Mar. 23, 2021

(54) AEROBRAKING SATELLITE DEORBITING SYSTEM

(71) Applicant: ARIANEGROUP SAS, Paris (FR)

(72) Inventors: Benjamin Rasse, Bordeaux (FR); Patrice Damiano, Toulouse (FR)

(73) Assignee: ARIANE GROUP SAS

( * ) Notice: Subject to any disclaimer, the term of this patent is extended or adjusted under 35 U.S.C. 154(b) by 766 days.

(21) Appl. No.: 15/548,220

(22) PCT Filed: Feb. 2, 2016

(86) PCT No.: PCT/EP2016/052173
§ 371 (c)(1),
(2) Date: Aug. 2, 2017

(87) PCT Pub. No.: WO2016/124591
PCT Pub. Date: Aug. 11, 2016

(65) Prior Publication Data
US 2018/0029728 A1 Feb. 1, 2018

(30) Foreign Application Priority Data
Feb. 3, 2015 (FR) ...................................... 1550829

(51) Int. Cl.
| | | |
|---|---|---|
| *B64G 1/62* | (2006.01) | |
| *B64G 1/10* | (2006.01) | |
| *B64G 1/34* | (2006.01) | |
| *B64G 1/22* | (2006.01) | |
| *B64G 1/24* | (2006.01) | |

(52) U.S. Cl.
CPC ................. *B64G 1/62* (2013.01); *B64G 1/10* (2013.01); *B64G 1/222* (2013.01); *B64G 1/242* (2013.01); *B64G 1/34* (2013.01)

(58) Field of Classification Search
CPC .......... B64G 1/222; B64G 1/242; B64G 1/34; B64G 1/62; B64G 1/10
USPC ....................................................... 244/158.7
See application file for complete search history.

(56) References Cited

U.S. PATENT DOCUMENTS

| | | | |
|---|---|---|---|
| 6,830,222 B1 | 12/2004 | Nock et al. | |
| 2005/0211828 A1* | 9/2005 | Gloyer .................. | B64G 1/007 244/51 |
| 2009/0218448 A1* | 9/2009 | Peypoudat .............. | B64G 1/62 244/158.7 |

FOREIGN PATENT DOCUMENTS

| | | | |
|---|---|---|---|
| FR | 2897842 | 8/2007 | |
| FR | 2897843 | 8/2007 | |
| JP | S58112899 A * | 7/1983 | ............... B64G 1/24 |

(Continued)

OTHER PUBLICATIONS

Translation of JPS58112899A (Year: 1983).*

(Continued)

*Primary Examiner* — Richard R. Green
*Assistant Examiner* — Steven J Shur
(74) *Attorney, Agent, or Firm* — Perman & Green, LLP

(57) ABSTRACT

A satellite deorbiting device including an aerobraking surface including a satellite attitude control device with gravity gradient, the device with gravity gradient including at least one mast carrying the aerobraking surface, a first end of which is secured to the satellite and the second end of which is provided with a mass, such that the mast is oriented in a direction opposing that of the planet around which the satellite orbits.

9 Claims, 7 Drawing Sheets

(56) References Cited

FOREIGN PATENT DOCUMENTS

WO           0202402       1/2002
WO     WO-0202402 A1 *   1/2002             B64G 1/244

OTHER PUBLICATIONS

Hanna Prince, Jill L, and Scott A Striepe. "NASA Langley Trajectory Simulation and Analysis Capabilities For Mars Reconnaissance Orbiter." Grctechlib, NASA, Mar. 20, 2009, web.archive.org/web/20090320204425/grctechlib.grc.nasa.gov/public/Digital/sg/MarsScout/Langley_trajectory_MRO.pdf (Year: 2009).*

Howard D. Curtis "Orbital Mechanics for Engineering Students.", Third Edition, Elsevier, 2014, Sections 6.10 and Section 11.2 (Year: 2014).*

International Search Report, International Application No. PCT/EP2016/052173, dated Apr. 12, 2016.

* cited by examiner

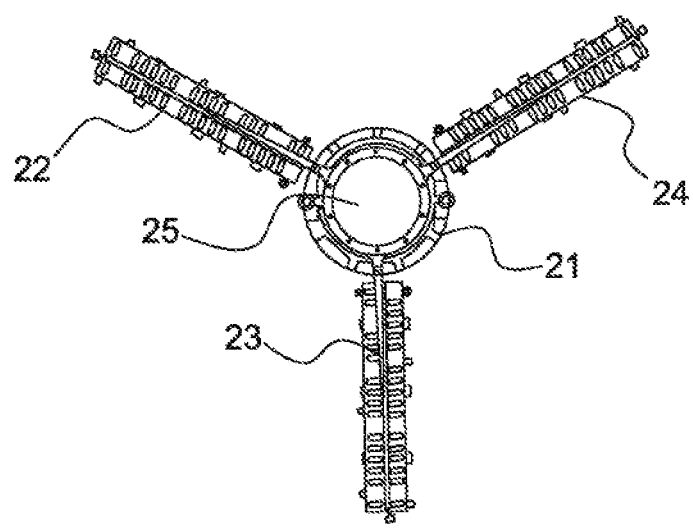
Fig.11
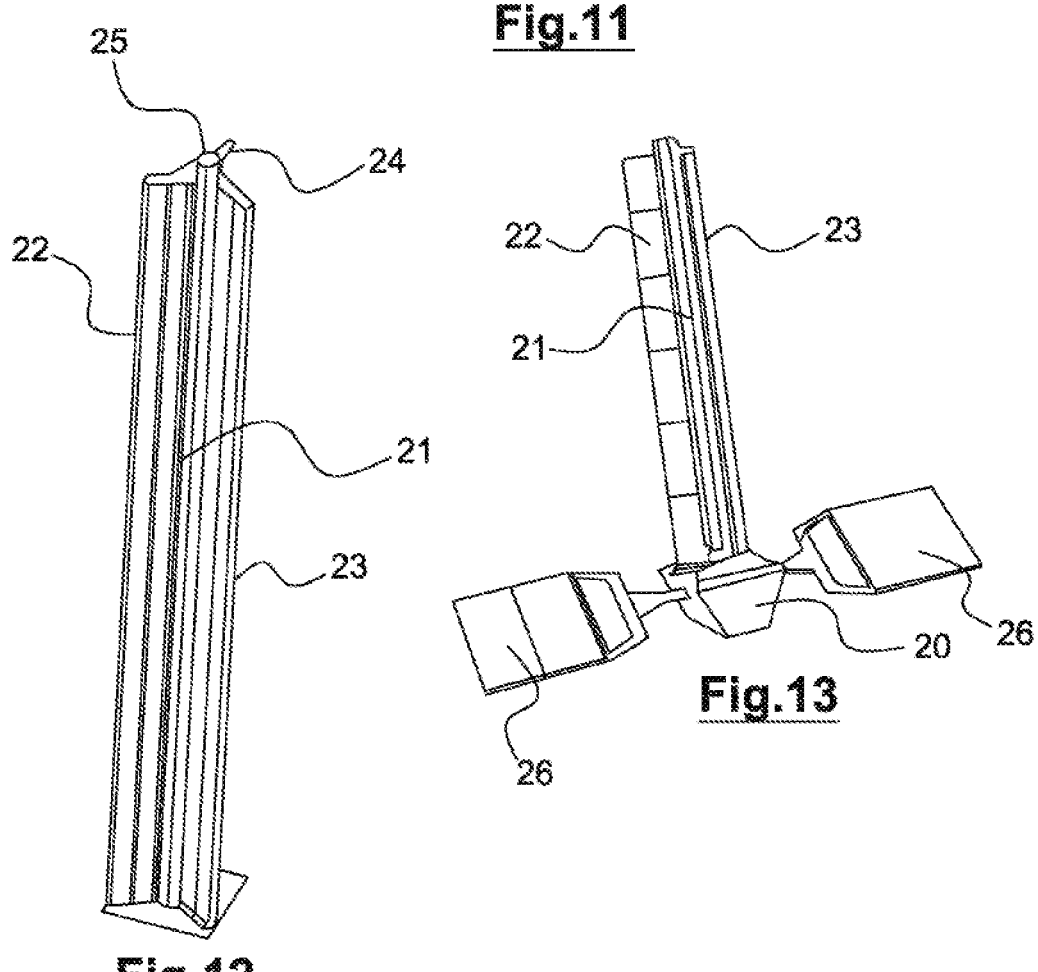
Fig.12
Fig.13

AEROBRAKING SATELLITE DEORBITING SYSTEM

CROSS REFERENCE TO RELATED APPLICATIONS

This application is the National Stage of International Application No. PCT/EP2016/052173, having an International Filing Date of 2 Feb. 2016, which designated the United States of America, and which International Application was published under PCT Article 21(2) as WO Publication No. 2016/124591 A1, and which claims priority from and the benefit of French Application No. 1550829, filed 3 Feb. 2015, the disclosures of which are incorporated herein by reference in their entireties.

BACKGROUND

1. Field

The presently disclosed embodiment is situated in the field of aerobraking structures for deorbiting satellites and provides a system for this purpose.

In the satellite field there exist more and more regulations or rules of good practice that require operators to eliminate their satellites from their orbit after their end of operational life, planned or accidental end of life.

The presently disclosed embodiment concerns more particularly satellites in so-called low Earth orbit, below 2000 km, for which after their end of life the satellites must be either deorbited or sent into a so-called "cemetery" orbit above 2000 km. This operation must moreover be effected in less than 25 years.

2. Brief Description of Related Developments

At present no satellite is able to meet this requirement without carrying on board a dedicated deorbiting system of high mass or without using a large fraction (approximately 30%) of the onboard hydrazine to move the satellite into deorbiting position.

Among the various solutions possible for the deorbiting operations there have been proposed aerobraking sails, i.e. surfaces that use the residual atmosphere present in low Earth orbit as an aerodynamic brake to brake and to slow an object, and thus in the end to reduce the altitude of its orbit.

This type of solution is dedicated to the operation of deorbiting the satellites.

These surfaces utilize ultra lightweight structures, spider web structures or "gossamer" structures well known in the aerospace industry.

The aerobraking principle is described for example in the document FR 2 897 842 A1 which relates to the principle of deorbiting using an aerobraking structure and the document FR 2 897 843 A1 which describes a technological solution for the production of such a sail. The above two documents emphasize the relationship between the efficacy of the aerobraking structure and the stability of the satellite and propose solutions for preserving effective aerobraking despite satellite instability. In fact, after its operational life, a satellite is no longer maintained under control by its operator: the satellite generally then begins to rotate on itself because of the effect of various forces that vary in time: aerodynamic drag, solar wind, magnetic field, variable gravitational field; the satellite no longer has a stable attitude in its orbit and the aerobraking structure can no longer be oriented optimally relative to the trajectory of said satellite.

Now, to function effectively the aerobraking structure should be perpendicular to that trajectory at all times. To alleviate the instability that rules out this perpendicularity, the prior art structure is designed to operate even in the case of an incorrect position of the satellite relative to its trajectory. This leads however to overrating the aerobraking structure that weighs on the mass balance of the satellite in contrast to the situation in which the satellite is stabilized.

Moreover, as stated above, aerobraking uses the residual atmosphere at high altitude to brake an object but the higher the altitude the more tenuous the atmosphere and therefore the less effective the braking. There are available for calculation standard or empirical models of the upper atmosphere such as the NRLMSISE-00 tools of the USA Naval Research Laboratory, the CIRA published by COSPAR (Comité pour la recherche spatiale) or Jacchia (L. G. Jacchia, Smithsonian Astrophysical Observatory Special Report No 375, 1977).

It is found that the atmospheric densities in reality depend on the activity of the sun and correlate with solar activity cycles as represented in FIG. 1 representing the atmospheric density at 400 km as a function of solar activity.

The abscissa axis of the table represents time in years, the lower curve represents the radio solar flux at the wavelength of 10.7 cm measured, in sfu—(Solar Flux Units)—1 sfu=10-22 W/m²/Hz—and the upper curve represents the density $\log_{10} \rho$ expressed on a logarithmic scale, $\rho$ being the density expressed in kg/m³. This figure shows the well-known solar activity cycle over 11 years.

The impact of solar activity is particularly great at altitudes above 500 km. FIG. 2 represents the atmospheric density curves for a maximum solar activity (curve 1) and a minimum solar activity (curve 2) with the altitude in km plotted on the abscissa axis and the density $\log_{10} \rho$ expressed on a logarithmic scale plotted on the ordinate axis. It is seen in this figure that the atmospheric density varies from 1 to 10 at 400 km altitude and from 1 to 100 at 700 km as a function of the solar activity minima/maxima.

Because of these density variations, there is a very wide spread of the re-entry time when aerobraking deorbiting systems are used. With the same satellite initially in a circular orbit at 720 km altitude, the deorbiting time can vary from a minimum of 20 years to a maximum of 30 years depending on whether the date of starting deorbiting is at a solar activity maximum or minimum. This very wide spread of performance is a major handicap in the application of legal obligations linked to operating in space requiring re-entry in less than 25 years.

FIG. 3 represents by way of example the modeling of the altitude variations at apogee 3 and at perigee 4 of a satellite for deorbiting starting at a solar activity minimum, with time expressed in years plotted on the abscissa axis (Time (years)) and the altitude in km plotted on the ordinate axis. It will be noted that during the 30 years duration of deorbiting the satellite experiences three solar peaks seen in the figure. This figure shows that deorbiting is very slow at high altitude and in contrast very rapid below 600 km. This demonstrates the benefit of optimising aerobraking at high altitude. Moreover, note that each solar activity peak is the source of a significant acceleration of deorbiting.

This modeling is carried out using well known tools such as the STELLA software from the CNES (Centre National d'Etudes Spatiales, France).

It is moreover known to stabilize a satellite by means of a gravity gradient. This well-known technology is based on a physical phenomenon that explains why the Moon always has the same side facing the Earth.

This stabilization stems from the fact that when an object in orbit around the Earth does not have a homogeneous density it is subjected to a restoring torque because of the variation of the gravitational field that tends to orient it so that its most dense part is closest to the Earth.

This effect has been used to stabilise satellites in their orbit, for example by adding to them a beam at the end of which a mass is placed. If the system is well designed, the satellite S tends to balance itself with the beam P positioned in a direction passing through the center of the Earth, the satellite being close to the Earth, and the mass M on the opposite side as shown in FIG. 4.

Of course, the real situation is slightly more complex and there are stability problems. It is possible to control those problems in particular by the appropriate choice of the length of the beam and the mass placed at its end, depending on the mass and the orbit of the satellite.

The document WO02/02402 A1 illustrates this principle and provides a small solar panel at the end of the mast to compensate a torsion of the mast.

SUMMARY

The presently disclosed embodiment aims to propose a simple and low energy cost solution because of the little mass that it adds to make it possible to quarantee deorbiting over a controlled period of a satellite that is at its end of life or is to be deactivated. The presently disclosed embodiment moreover proposes to optimize the production of a deorbiting device using an aerobraking sail to increase its efficacy and to reduce the spread of deorbiting times linked to the variation of the density of the residual atmosphere as a function of the solar cycle.

Optimizing the efficacy of the aerobraking sail when it is required to deorbit the satellite entails maintaining it continuously in a position as perpendicular as possible to the trajectory of the satellite. This makes it possible to increase the efficacy/sail mass ratio.

To this end, the presently disclosed embodiment proposes a satellite deorbiting device including an aerobraking surface, characterized in that it includes a gravity gradient satellite attitude control device, the gravity gradient device including at least one mast carrying the aerobraking surface and a first end of which is secured to the satellite and the second end of which is provided with a mass, such that said mast orients itself in a direction opposite the direction of the planet around which the satellite orbits.

The gravity gradient device is advantageously adapted to return the aerobraking surface to a direction perpendicular to the trajectory of the satellite.

The aerobraking surface is preferably such as to retain an effective aerobraking area whatever the orientation of the satellite about an axis parallel to the satellite/planet center direction.

According to a first particular aspect, the aerobraking surface includes at least two panels.

According to a second particular aspect, the aerobraking surface includes three panels disposed around said axis at 120°.

The disclosed embodiment applies to a satellite including a deorbiting device according to the disclosed embodiment.

The disclosed embodiment further proposes a method of producing a satellite including a deorbiting device as defined above that comprises the steps of:

defining the location and the direction of installation of the mast intended to support the aerobraking sail on the satellite;

modeling the re-entry of the satellite using a modeling tool so as to determine the altitude at which the satellite flips that corresponds to the maximum altitude that makes it possible to guarantee an end of re-entry in a given time;

determining by successive iterations and approximations the area $S_{aero}$ of the sail, the length m of the mast and the mass at its end such that the flipping point is approximately situated at the altitude determined previously with the chosen total re-entry duration;

retaining solutions that make it possible to minimize the total mass of the device comprising the sail, the mass and the mast; and defining the real sail with one, two or three panels so that it has the length of the mast and the area $S_{aero}$ previously defined.

The iterations are advantageously effected using the equations $$\vec{C^{gg}} = -\frac{3\mu}{R^3} * ([I], \vec{Zo}) \wedge \vec{Zo};$$

$$\vec{F} = -\rho \frac{Saero}{m} C_D V^2 \frac{\vec{V}}{V}$$

and $C_{aero} = F \cdot D \cdot \cos(\varepsilon_y)$.

The mast can notably be defined perpendicular to the surface of the satellite having the largest area S2.

As an alternative or in addition to this, the mast can be defined with its axis passing through the center of mass of the satellite.

BRIEF DESCRIPTION OF THE DRAWINGS

Other features and advantages of the disclosed embodiment will become apparent on reading the following description of one nonlimiting aspect of the disclosed embodiment with reference to the drawings, which show:

FIG. 11 is a plan view of an example of an aerobraking sail for a satellite of the disclosed embodiment;

FIG. 12 is a perspective view from the side of the sail from FIG. 11;

FIG. 13 is a satellite including a sail according to FIGS. 11 and 12;

DETAILED DESCRIPTION

The principle of the disclosed embodiment consists in equipping a satellite with a deorbiting system that is deployed at the satellite end of life and combines a deorbiting sail and a gravity gradient device to maintain said sail in a position generating a high drag adapted to brake the satellite and therefore to cause it to lose altitude.

The device stabilizes the satellite at end of life by means of the gravity gradient device, the sail and the gravity gradient device being designed so that the sail is the most perpendicular to the trajectory despite the flipping torque caused by drag. The disclosed embodiment also has the object of designing the sail and the gravity gradient device so that the denser the residual atmosphere the more the sail departs from this perpendicular position but remains within the stable range of the system.

The gravity gradient device more particularly consists of a mast fixed to the satellite and a remote mass at the opposite end of the mast to the satellite.

The sail and the gravity gradient device are ideally combined; for example, this can be the case of the sail of the type described in the document FR 2 897 843 A1 that extends along a mast that is deployed when it is required to begin the deorbiting of a satellite. The mass of the gravity gradient device enabling the stabilization of the satellite during deorbiting is placed at the end of the mast carrying the aerobraking sail.

Moreover, the disclosed embodiment also concerns the operation of the gravity gradient aerobraking sail during the evolution of the orbit of the satellite as it descends.

Figure 1:
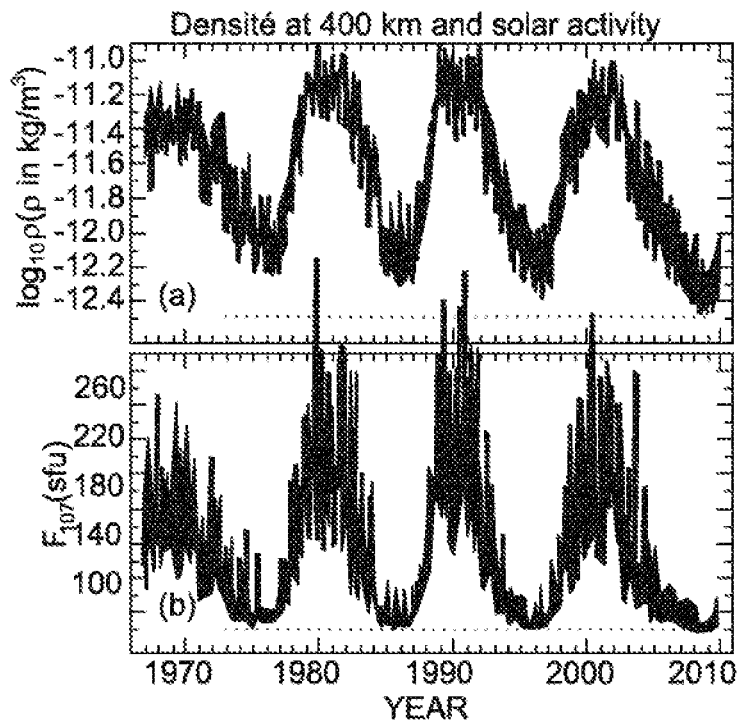
FIG. 1 is a graph showing the correlation between the variation of density at a given altitude as a function of the solar flux.
Figure 2:
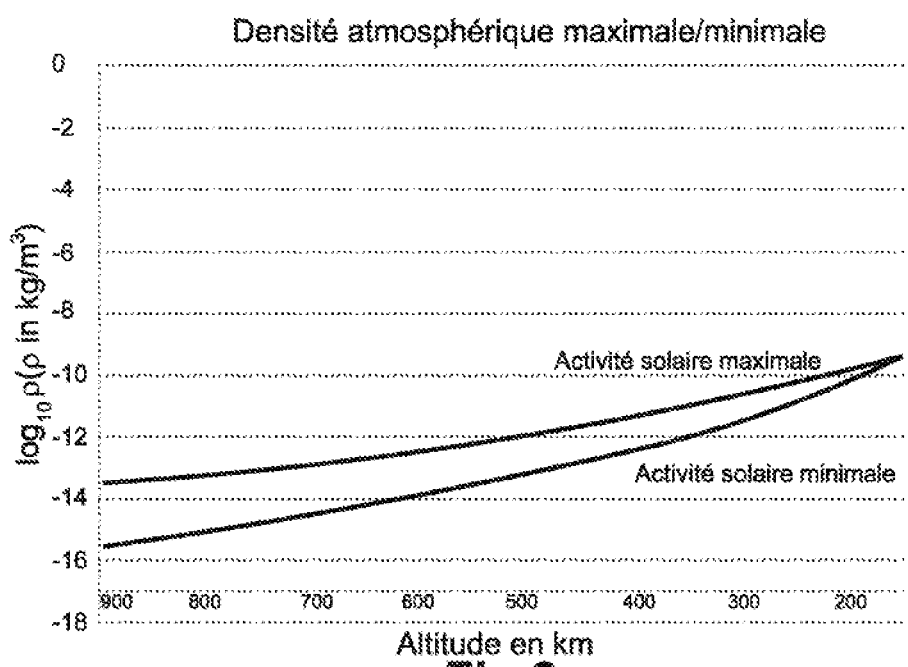
FIG. 2 is a graph showing the minimum and maximum densities of the atmosphere as a function of altitude according to solar activity minima/maxima.
Figure 3:
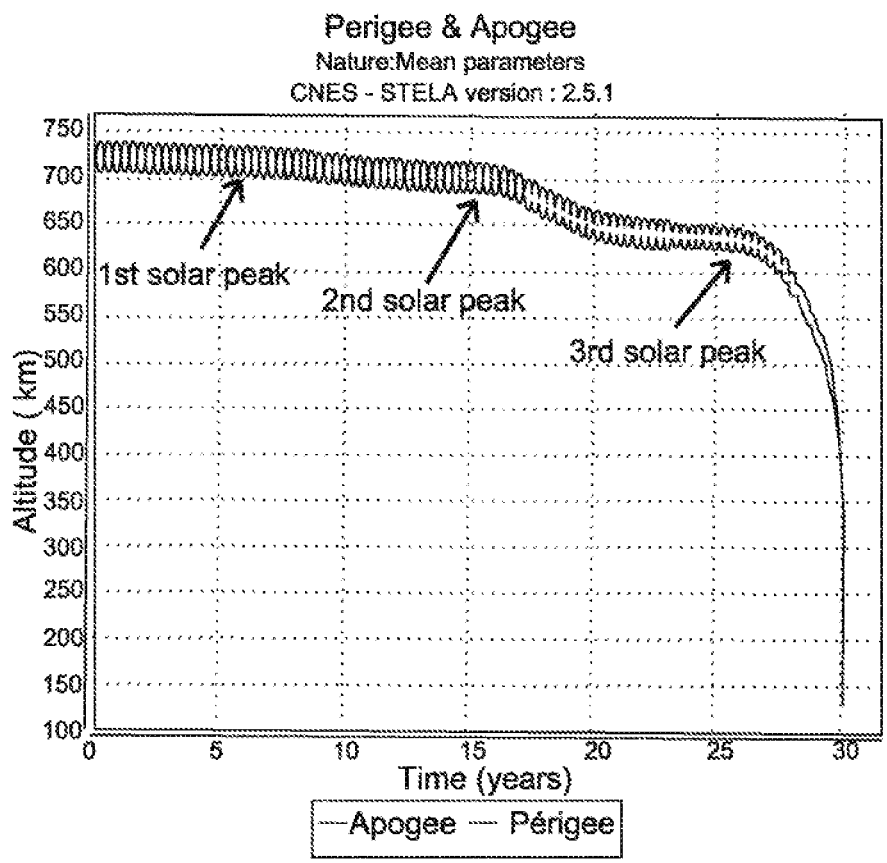
FIG. 3 is a graph of deorbiting with the roost unfavorable altitude as a function of time for a given satellite.
Figure 4:
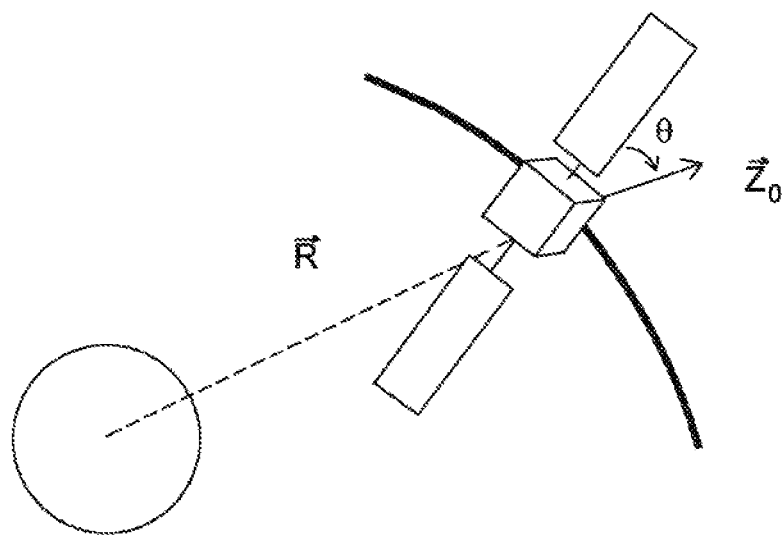
FIG. 4 is a diagrammatic view of the principle of stabilization by gravity gradient applied to a satellite.

According to FIG. 4 gravity gradient stabilization consists in applying to the mast M fixed to the satellite S a force $Z_0$ in the direction opposite the satellite-Earth direction T.

The theory of the gravity gradient is illustrated below with reference to FIG. 5.

The gravity gradient torque $\vec{C^{gg}}$ exerted on a satellite is given by:

$$\vec{C^{gg}} = -\frac{3\mu}{R^3} * ([I], \vec{Z_0}) \wedge \vec{Z_0}$$

With:
µ: gravity constant,
R: Satellite—center of the Earth distance,
$Z_0$: unit vector of the local orbital system of axes, according to the Earth satellite direction, axis T,
[I]: inertia matrix of the satellite in the system of axes of the satellite that comprises principal inertia axes $\vec{x}\,\vec{y}\,\vec{z}$ as defined in FIG. 8, the axis z extending in the opposite direction to the mast.

There is obtained in this way a restoring torque toward a stable attitude position of the satellite. Oscillations about the equilibrium position are naturally damped and dissipated by the flexible appendages (masts, sails), sloshing in the tanks and atmospheric friction.

Figure 5:
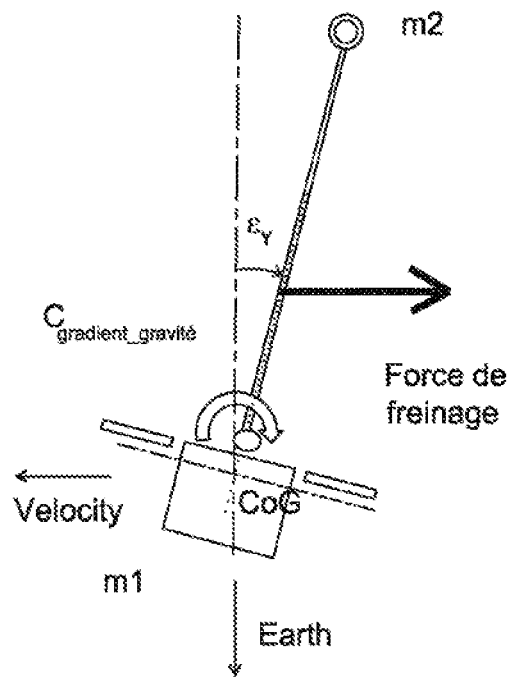
FIG. 5 is a diagrammatic view of a satellite utilizing the gravity gradient stabilization principle.

FIG. 5 shows a satellite of mass m1 including a deployed aerodynamic surface along a mast 21 and a mass m2 at the mast end.

The gravity gradient pushes the mast into alignment with the Earth direction T, the mast taking up a position on the opposite side to the Earth relative to the body of the satellite.

When the satellite is provided with an aerobraking sail having a direction parallel to the mast and an aerodynamic surface perpendicular to the direction of the satellite velocity, the deployed aerodynamic surface is almost normal to the velocity vector of the satellite and creates a maximum braking force.

The braking force F is given by the equation:

$$\vec{F} = -\rho \frac{S_{aero}}{m} C_D V^2 \frac{\vec{V}}{V},$$

with:
ρ: atmospheric density,
$S_{aero}$: aerobraking aerodynamic area (perpendicular to the trajectory of the satellite), also termed the "effective" braking area,
m: satellite mass,
$C_D$: aerodynamic coefficient,
V: satellite velocity.

The aerobraking torque is then: $C_{aero}=F \cdot D \cdot \cos(\varepsilon_y)$, D being approximately the half-length of the mast; $\varepsilon_y$ being the angle between the mast and the Earth-satellite direction, equilibrium angle of the satellite subject to the aerobraking torque $C_{aero}$ and the gravity gradient torque $\vec{C^{gg}}$.

Equilibrium is then established between the gravity gradient torque and the torque linked to the application of the drag force at the aerodynamic center. The concept of stabilization of the sail therefore makes it possible to maximize the use of the available aerobraking area, stabilizing the satellite and avoiding flipping of the satellite on itself. The satellite has a total aerodynamic area varying with the pitch angle $\varepsilon_y$. In an approximate manner:

$$S_{aero}=S1 \cdot \cos(\varepsilon_y)+S2 \cdot \sin(\varepsilon_y)$$

with:
S1: principal aerobraking area ($S_{satellite}+S_{deployed}$);
S2: secondary area after flipping of the satellite; typically S1>10*S2.

It is clear that when the atmospheric density ρ increases the force F increases and likewise the pitch angle $\varepsilon_y$, which reduces $S_{aero}$.

Finally, by stabilizing the satellite using the gravity gradient device, the variations of the product $\rho*S_{aero}$ are reduced, which makes it possible to obtain partial decoupling of the braking performance of the satellite and solar activity at a given altitude. The variation of the deorbiting time therefore depends less on the solar cycle and on average the deorbiting prediction is improved.

The combination of an aerobraking sail and a gravity gradient device will therefore ensure a deorbiting time minimizing the spread of the re-entry time regardless of the phasing of the date at which deorbiting begins and solar cycles or the intensity of solar cycles.

Figure 6:
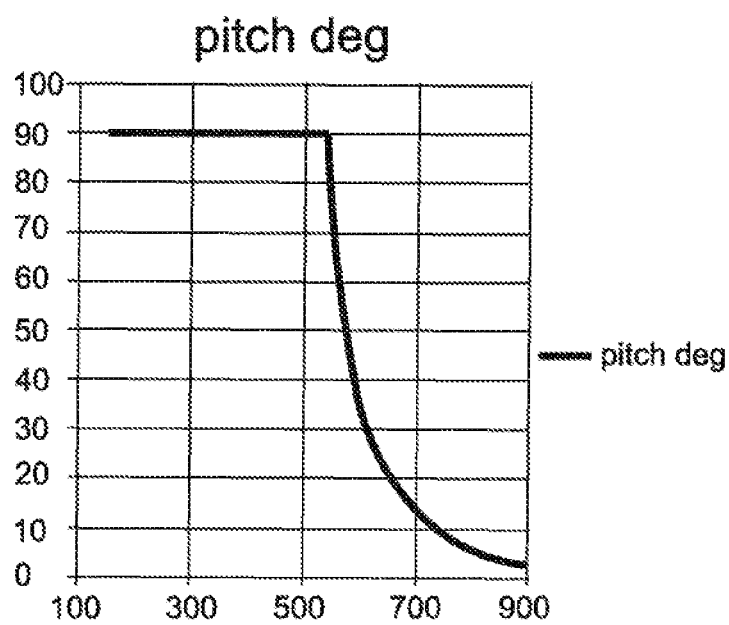
FIG. 6 is a graph representing the pitch angle of a satellite according to the disclosed embodiment as a function of altitude.

FIG. 6 gives an example of variation of the pitch angle curve ("pitch deg") with altitude for a mean residual atmosphere profile with plotted on the abscissa axis the altitude in km and on the ordinate axis the inclination in pitch expressed in degrees.

This table is for a 250 kg satellite equipped with an 8 m high deorbiting mast including a sail with three panels 8 m high, 0.55 m wide and each with a mass of 0.54 kg disposed around the mast at 120°.

It is found that the higher the atmospheric density, the less the gravity gradient torque is able to compensate the drag torque: the angle $\varepsilon_y$ increases and the satellite flips until $\varepsilon_y$ reaches 90°. The satellite in its orbit has then reached a second equilibrium position and then has a constant aerodynamic area $S_{aero}$, (S2) that is smaller whatever the increase of atmospheric pressure.

It is therefore found that in this situation the concept of stabilization of the sail also makes it possible to maximize the use of the available aerobraking area even if the satellite flips on itself.

Figure 7:
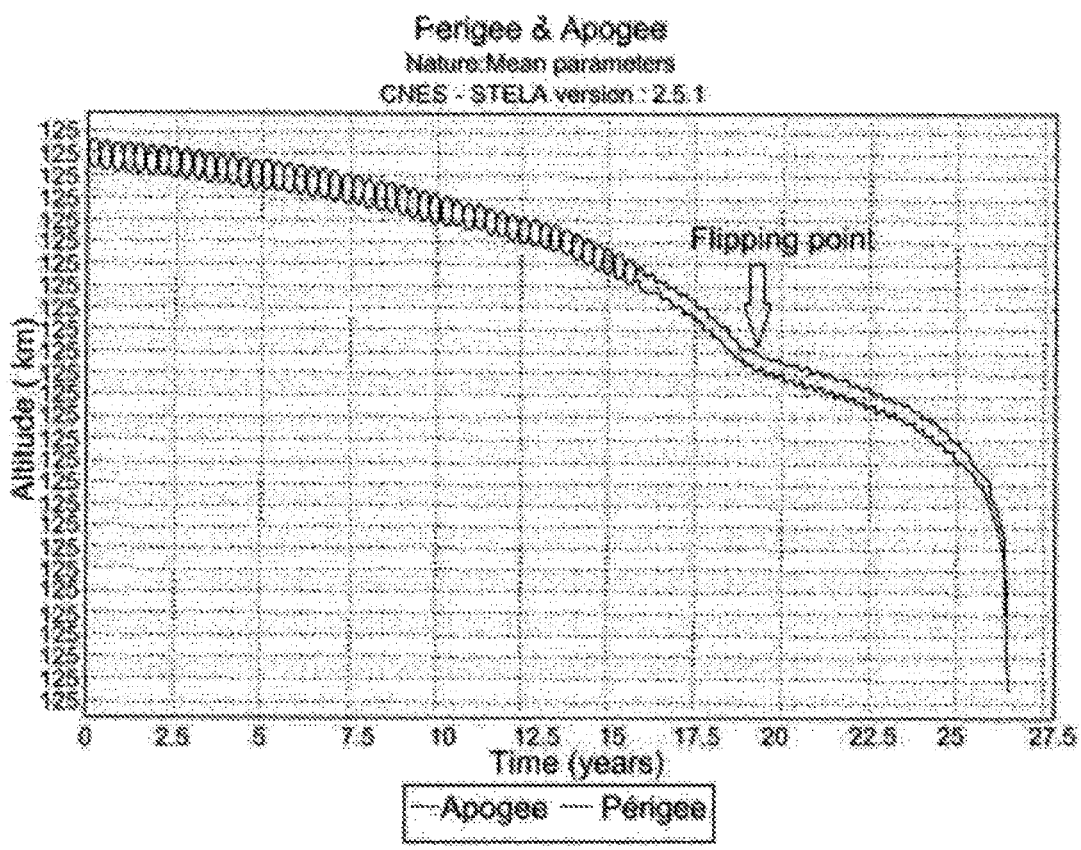
FIG. 7 is a graph representing the re-entry profile of a satellite according to the disclosed embodiment.

Moreover, the so-called flipping altitude at which this second equilibrium position is reached is also a criterion for the dimensions of the aerobraking area. FIG. 7 shows the variations of altitude in apogee 3' and perigee 4' of a stabilized satellite with plotted on the abscissa axis time expressed in years and on the ordinate axis the altitude in km. The flipping point 5 must occur at a sufficiently low altitude, between 500 and 550 km and typically of the order of 525 km, where the atmospheric braking is sufficiently high to guarantee re-entry in a few years (3-5 years maximum) and for the solar activity variation to have negligible impact on the re-entry time of the satellite having a constant aerodynamic area (S2). The adjustment of this tipping altitude is effected by the design values for the mast length parameter and the mast end mass parameter.

Figure 8:
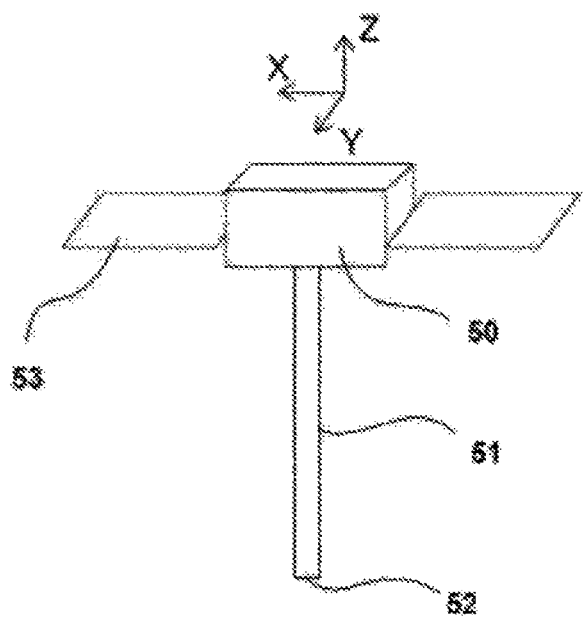
FIG. 8 is a diagrammatic perspective view of a satellite constructed in accordance with the principle of the disclosed embodiment.

A concrete satellite example is given hereinafter by way of example and with reference to FIG. 8.

The reference situation is a 250 kg satellite 50, a 9 m mast 51 and a 3.5 kg mast end mass 52. The panels forming the sail notably represented deployed in FIGS. 11 to 13 are rectangular panels extending along the mast that are 9 m=0.55 m each with a mass of 0.54 kg. The body of the satellite measures 1 m×1 m×0.6 m and in the example includes two small solar panels 53 that are 1 m×0.6 m. The restoring torque of the gravity gradient in this case approximately 1 mN·m.

Figure 9:
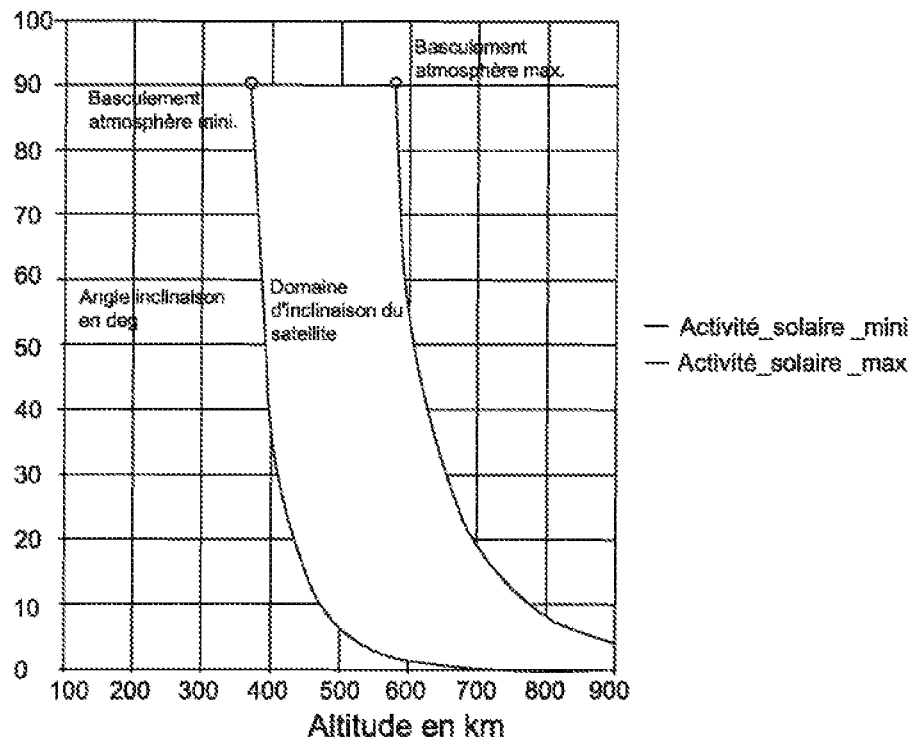
FIG. 9 is a graph representing the inclination of a satellite according to the disclosed embodiment as a function of solar activity and taking into account the balance between the restoring torque created by the gravity gradient and the torque created by the aerodynamic force on an aerobraking sail of said satellite.

FIG. 9 makes it possible to determine the inclination I of the satellite in degrees as plotted on the ordinate axis (0 to 100 degrees in 10° steps) relative to the altitude A in km (100 km to 900 km in 100 km steps) as a function of solar activity taking account of the equilibrium between the restoring torque of the gravity gradient and the torque created by the aerodynamic force on the membrane of the sail.

The curve 8 in this figure corresponds to minimum solar activity and the curve 9 corresponds to maximum solar activity. Between these two curves lies the range of inclination of the satellite 10. The point 6 corresponds to tipping of the satellite in minimal atmosphere (minimum solar activity) and the point 9 corresponds to tipping with maximum atmosphere (maximum solar activity).

Figure 10:
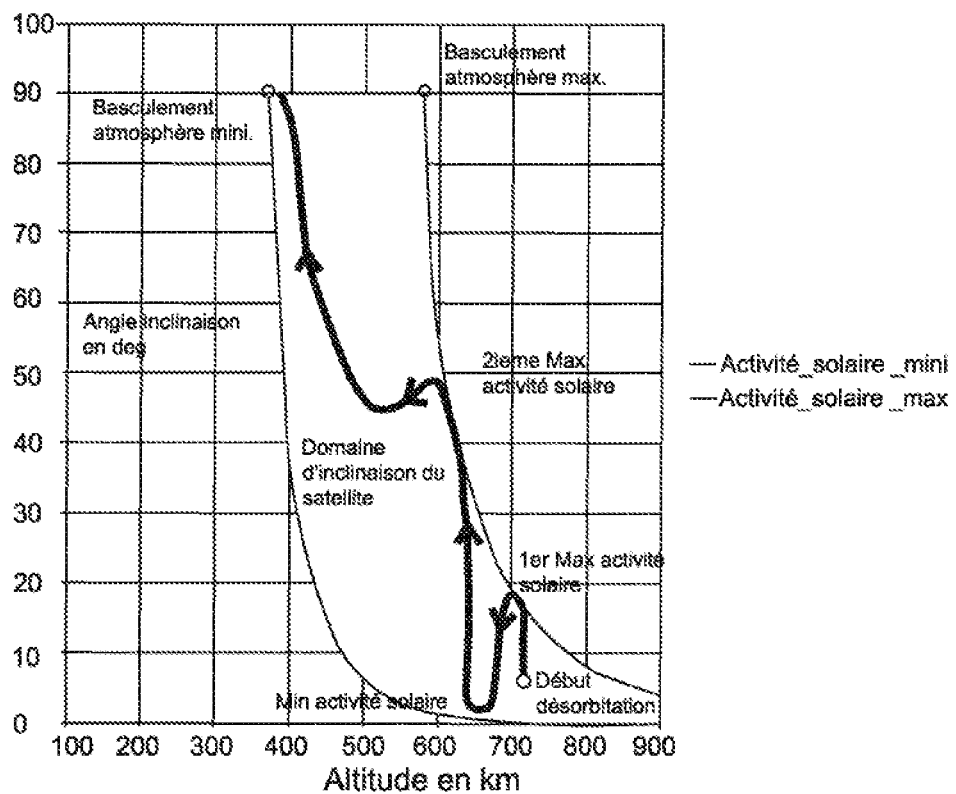
FIG. 10 is the illustration of a special case of FIG. 9.

FIG. 10 corresponds to the inclination of a satellite taking the example of deorbiting starting at 725 km with an atmosphere of medium density over a rising solar activity cycle. The inclination of the satellite as a function of its altitude is given considering deorbiting over slightly more than one solar cycle with a first activity maximum 12 and a second activity maximum 11 between the start 14 of deorbiting and the end 6 of deorbiting.

As a function of this data, the mast end mass is adjusted to make it possible to ensure tipping at an altitude between 500 and 550 km in the case of medium solar activity.

These values are given by way of example, a precise calculation being required for each situation as a function of the date of starting deorbiting and the parameters of the satellite.

FIGS. 11 and 12 show a 9 m long mast 21 of the type discussed above. The mast carries a mast head mass 25 and a deorbiting sail here comprising three membranes 22, 23, 24 disposed around the mast at 120° for both gravity gradient stabilization and deorbiting.

The mast can be an inflatable mast for example utilizing the technology known from the document FR 2 877 315 A1 for deploying it for the purpose of deorbiting the satellite.

The sail comprises three 9 m×0.55 m panels extending along the mast and disposed around the mast at 120°. These panels are produced with membranes having a mass of 0.54 kg which ensures effective braking whatever the yaw angle of the satellite, compensating the absence of stability in rotation about the mast. This configuration achieves a maximum aerodynamic area of 9.6 m² including 9 m² of membrane area and 0.6 m² for the satellite when solar activity is at a minimum with a total deployed area of 16.2 m².

It is however possible to provide only two membranes disposed in a V with an angle between them making possible a compromise between the effective braking area and the stabilization of the satellite about an axis passing through the mast.

A solution with a cylindrical sail but with lower optimization in terms of deployed area can be considered.

FIG. 13 shows a satellite 20 provided with two solar panels 26 and equipped with the mast and the sail from FIGS. 11 and 12.

Figure 14:
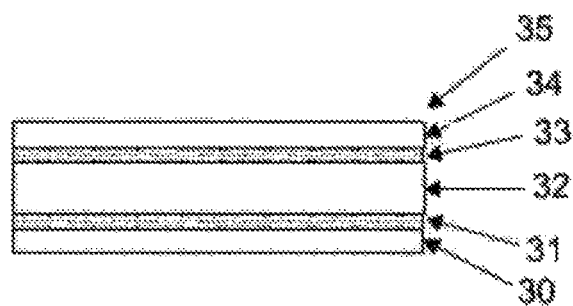
FIG. 14 is an example of materials for the production of a mast according to the disclosed embodiment.

The following materials are used to manufacture the mast and the membranes:

As shown in FIG. 14 the mast is an inflatable mast that is made from an aluminum/polyimide film laminate (registered trademark Kapton) 130 µm thick with a 250 g/m² coating of SiOx to provide protection against the atomic oxygen present in low Earth orbit.

It includes from the interior toward the exterior a first internal polyimide film 30, a first polyester adhesive 31, an aluminum foil 32, a second polyester adhesive 33, a second polyimide film 34 and the silicon oxide coating 35.

Figure 15:
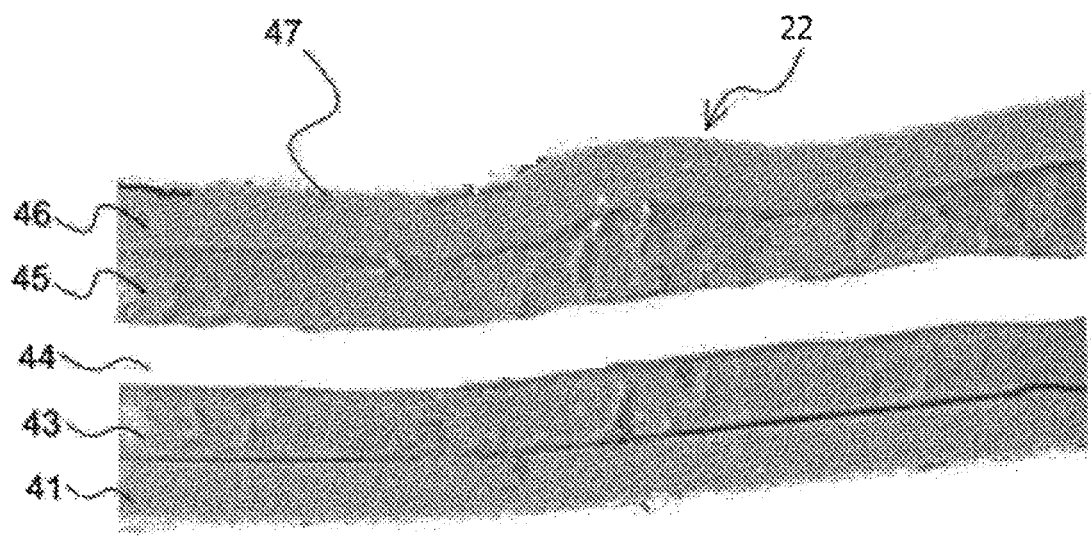
FIG. 15 is a sectional view of an aerobraking sail membrane applicable to the disclosed embodiment.

The aerodynamic membrane 22 shown in section in FIG. 15 includes an aluminum/polyimide film (aluminum/Kapton) laminate approximately 40 to 80 µm thick with a 100 g/m² coating of SiOx.

From one face to the other the membrane comprises a SiOx coating 41, a first polyimide film 43 12 to 15 microns thick, a layer 43 of glue 10 to 15 microns thick, an aluminum foil 14 to 15 microns thick, a second layer 45 of glue, a second polyimide film 46 and a second SiOx coating layer 47.

The disclosed embodiment can be applied to satellites of 100 to 500 kg in LEO out to a maximum altitude of approximately 850 km.

Depending on the mass of the satellite and its flight altitude, the deorbiting time is obtained by adjusting the height of the deployed mast and the mast end mass to ensure stabilization of the attitude by gravity gradient and tipping at an altitude below 550 km.

The disclosed embodiment as defined by the claims is not limited to the example represented in the figures, and in particular the position of the mast can be modified and pass or not pass through the center of mass of the satellite.

The method of defining a deorbiting sail of a satellite according to the disclosed embodiment is as follows (it is assumed that the satellite is known in terms of mass and geometry, which inter alia defines its aerobraking area S2 at low altitude, for all attitudes of the satellite; it is also assumed that the aim is to guarantee re-entry in less than 25 years, and that the altitude of the satellite is of the 800 km type):

the location and the direction for installation of the mast intended to support the aerobraking sail are defined, the mast being typically, but not necessarily, perpendicular to the surface of the satellite having the greatest area S2, and the axis of the mast possibly but not necessarily passing through the center of mass of the satellite to simplify the calculations;

satellite re-entry is modeled using a known tool such as the Stella tool from CNES, which makes it possible to determine the maximum altitude that makes it possible to guarantee an end of re-entry in less than 3 to 5 years; in other words, the tipping altitude of the satellite;

successive iterations and approximations are then used to determine the area $S_{aero}$ of the sail, the length m of the mast and the mass at its end to guarantee:

that the tipping point is situated approximately at the altitude previously determined;

that the total duration of re-entry is that expected;

the solutions are chosen that make it possible to minimize the total mass of the device comprising the sail plus the mass and the mast; and the real sail is then defined with one, two or three panels so that it has the length of the mast and the area $S_{aero}$ defined previously.

The iterations are performed with a software tool of the Stella type from CNES and using equations for gravity gradient torque and aerodynamic torque of the type referred to above.

It should be noted that it is possible in accordance with the disclosed embodiment to aim for re-entry times shorter than 25 years and different initial altitudes. It is then necessary to adapt the duration of the various phases accordingly, given that the person skilled in the art knows that very short re-entry times from a high altitude are not reasonably possible with a sail of acceptable area and mass.

What is claimed is:

1. A satellite deorbiting device comprising an aerobraking sail wherein it includes a gravity gradient satellite attitude control device for holding attitude of the satellite, the gravity gradient device including at least one mast carrying the aerobraking sail and a first end of which is secured to the satellite and a second end of which is provided with a mass, such that said mast orients itself in a direction opposite the direction of the planet around which the satellite orbits, and the aerobraking sail including at least two sails made of membranes deployed with and extending along a length of the mast, where each of the at least two sails has a length substantially equal to the length of the mast.

2. The satellite deorbiting device as claimed in claim 1, wherein the gravity gradient device is adapted to return the aerobraking sail to a direction perpendicular to the trajectory of the satellite.

3. The satellite deorbiting device as claimed in claim 1, wherein the aerobraking sail is such as to retain an effective aerobraking area whatever the orientation of the satellite about an axis parallel to the satellite/planet center direction.

4. The satellite deorbiting device as claimed in claim 1, wherein the aerobraking sail includes three sails disposed around said axis at 120°.

5. A satellite comprising a deorbiting device as claimed in claim 1.

6. A method of producing a satellite as claimed in claim 5, the method comprising:

defining the location and the direction of installation of the mast intended to support the aerobraking sail on the satellite;

modeling the re-entry of the satellite using a modeling tool so as to determine an altitude at which the satellite flips during re-entry that corresponds to the maximum altitude to complete re-entry of the satellite in a given time and determine, based on a flipping point, a length m of the mast and the mass at an end of the mast;

determining, by successive iterations and approximations, an area $S_{aero}$ of the sail, based on the length m of the mast and a mass at the end of the mast, such that a flipping point effected from the determined length m of the mast and the mass at an end of the mast is approximately situated at the altitude determined with the chosen total re-entry duration; and providing the device comprising the sail of determined area $S_{aero}$, the mass having a determined minimized total mass, and the mast of determined length m;

wherein the sail has one, two or three panels having a length substantially equal to the mast of determined length m and the determined area $S_{aero}$.

7. The method as claimed in claim 6, wherein the iterations are effected using the equations $$\overrightarrow{C^{gg}} = -\frac{3\mu}{R^3} * ([I], \overrightarrow{Zo}) \bigwedge \overrightarrow{Zo};$$

$$\overrightarrow{F} = -\rho \frac{Saero}{m} C_D V^2 \frac{\overrightarrow{V}}{V};$$

and $C_{aero}$=F.D.cos $(\varepsilon_y)$.

8. The method as claimed in claim 6, wherein the mast is defined perpendicular to the surface of the satellite having the greatest area.

9. The method as claimed in claim 6, wherein the mast is defined with its axis passing through the center of mass of the satellite.

* * * * *